Patented Sept. 15, 1936

2,054,242

UNITED STATES PATENT OFFICE 2,054,242

MANUFACTURE OF ESTERS OF METHACRYLIC ACID

Wesley Cocker, John Stanley Herbert Davies, and Rowland Hill, Blackley, Manchester, England, assignors to Imperial Chemical Industries Limited, a corporation of Great Britain No Drawing. Application October 2, 1933, Serial No. 691,892. In Great Britain October 3, 1932

13 Claims. (Cl. 260—99.12)

The present invention relates to the manufacture of unsaturated esters and in particular to the dehydration of α-hydroxyisobutyric esters to give methacrylic esters.

According to the invention we treat an α-hydroxyisobutyric ester with an agent adapted to give the sulphuric ester thereof, that is, the hitherto undescribed compound represented by the formula

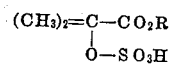

(where R stands for alkyl) and we submit the product, which may or may not be separated from the reaction mixture, to a heating treatment.

As agents adapted to give the sulphuric ester of an α-hydroxyisobutyric ester we may mention chlorosulphonic acid, "oleum" (fuming sulphuric acid), sulphur trioxide, the addition products of sulphur trioxide and tertiary bases, and pyrosulphates. The treatment of the α-hydroxyisobutyric esters with these agents may be carried out in presence or absence of a solvent, or other reagent, such as a tertiary base.

The heating treatment may be carried out on the isolated sulphuric ester, or it may be done by heating this in a suspending medium or after admixture with a diluent. The diluent may advantageously be a dehydrating solid, the sulphuric esters being hygroscopic substances. The diluent is advantageously one adapted to combine with sulphuric acid. Thus, we have found that anhydrous sodium sulphate is a very effective diluent as it combines with the free sulphuric acid generated in the reaction to give sodium hydrogen sulphate.

In carrying the invention into practical effect we add the α-hydroxyisobutyric ester, for example the methyl, ethyl, or n-butyl ester, slowly with stirring to 1 to 1½ molecular proportions of chlorosulphonic acid, at a moderate temperature, e. g. 50–80° C.

The viscous solution obtained is then either poured into cold water or to it is added a tertiary base such as diethylaniline. When it is added to water, the oily layer is separated, washed and distilled. When tertiary base is used, the mixture is forthwith submitted to fractional distillation. Other tertiary bases which may be employed are for example diethylaniline, pyridine, and homologues of these.

The addition of the α-hydroxyisobutyric ester to the chlorosulphonic acid takes place smoothly and without marked evolution of heat. As the reaction proceeds, hydrogen chloride is given off.

The chlorosulphonic acid used may vary in quantity but usually little more than 1 molecular proportion is needed. Other alkyl α-hydroxyisobutyrates, e. g. the amyl, octyl, decyl and higher alkyl esters, behave similarly. The invention is illustrated but not limited by the following examples in which the parts are by weight.

Example 1

66 parts of ethyl α-hydroxyisobutyrate are added slowly during ¾ hour with stirring to 72 parts (1.25 mol. proportion) of chlorosulphonic acid at 50° C. The stirring is then continued for a further hour at the same temperature.

The mixture is cooled and poured into 200 parts of a mixture of ice and water. The upper layer is separated and washed successively with sodium carbonate solution and water. It is then dried over anhydrous sodium sulphate and distilled, the fraction distilling at 118–120° C. being collected. This is almost pure ethyl methacrylate and is obtained in 70% of the theoretical yield.

Alternatively, after the ethyl α-hydroxyisobutyrate has been added to the chlorosulphonic acid and the stirring has been continued for another hour, 150 parts of diethylaniline are added. This mixture notwithstanding that it separates into 2 layers, is then distilled under atmospheric pressure, the fraction distilling up to 146° C. being collected. The distillate is shaken with potassium carbonate and redistilled, the fraction b. p. 118–120° C. being collected as before. The yield is again about 70% of the theoretical.

Example 2

80 parts of n-butyl-α-hydroxyisobutyrate are added slowly with stirring to 73 parts of chlorosulphonic acid during about ½ hour at 45°–50° C. The reaction mixture is then cooled to 20° C. and poured into 200 parts of a mixture of ice and water. The upper oily layer is separated and after washing with sodium carbonate and water, distilled with the addition of about 1% of its weight of hydroquinone. n-Butyl methacrylate distils as a colorless liquid, b. p. 162–163° C.

Example 3

59 parts of methyl α-hydroxyisobutyrate are mixed slowly with stirring with 59 parts of chlorosulphonic acid (1 molecular proportion) below 10° C. Hydrogen chloride is evolved and the mixture becomes progressively more viscous and finally solidifies to a whitish-yellow hygroscopic mass. Any remaining hydrogen chloride is removed by putting the mass under vacuum. The solid sulphuric ester, which deliquesces on exposure to a moist atmosphere, is then heated under reduced pressure either as it is or after being mixed with 71 parts of anhydrous sodium sulphate. Methyl methacrylate distils over and is collected in a cooled receiver. To the crude distillate are added a little soda-ash to take up any acid present and anhydrous sodium sulphate to remove the last traces of moisture. The methyl methacrylate is then decanted and distilled, the fraction distilling at 100–101° C. being collected. The yield is 80% of that calculated.

Alternatively, after adding the anhydrous sodium sulphate, the mixture is heated to 100° C., and then stirred into an excess of ice. The crude methyl methacrylate which separates as an upper oily layer is separated and purified by distillation.

*Example 4*

59 parts of methylhydroxyisobutyrate are added slowly with stirring to 62 parts of "oleum" containing 65% free SO₃ (i. e. 1 molecular proportion of sulphur trioxide) below 10° C. The viscous solution of the sulphuric ester in sulphuric acid thus obtained is then distilled under diminished pressure either alone or mixed with 110 parts of anhydrous sodium sulphate. The methyl methacrylate is collected and purified as in Example 3.

Instead of 62 parts of 65% oleum 124 parts of oleum containing 32.5% of free SO₃ may be used, a suitable amount of anhydrous sodium sulphate to use then being 193 parts.

*Example 5*

59 parts of methyl α-hydroxyisobutyrate and 222 parts (2 molecular proportions) of sodium pyrosulphate are mixed and boiled under a reflux condenser for five hours. The mixture is then distilled and the distillate is washed with dilute aqueous sodium carbonate solution, decanted off and dried over anhydrous sodium sulphate. The methyl methacrylate obtained is purified if desired by redistillation.

*Example 6*

33 parts of ethyl α-hydroxyisobutyrate and 111 parts (2 molecular proportions) of sodium pyrosulphate are heated together as in Example 5. The crude ethyl methacrylate is purified as described therein for the methyl ester, and boils at 118–120° C.

*Example 7*

59 parts of methyl hydroxyisobutyrate and 88 parts of pyridine-sulphur trioxide are heated together to boiling under a reflux condenser for about one half-hour. The mixture, which separates into layers, is distilled. The distillate (38 parts) after washing with dilute hydrochloric acid is dried over anhydrous potassium carbonate and sodium sulphate, and fractionated.

*General.*—The yields obtained by the processes described in Examples 1 and 2 are good except when methyl α-hydroxyisobutyrate is treated. Those obtained when the other examples are followed do not show a similar dependence on the nature of the alkyl group.

We claim:

1. The step in the manufacture of alkyl esters of methacrylic acid which comprises treating an alkyl ester of α-hydroxyisobutyric acid with an agent adapted to convert it into the sulphuric ester of formula

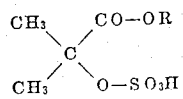

(where R stands for an alkyl group).

2. The step in the manufacture of alkyl esters of methacrylic acid which comprises treating an alkyl ester of α-hydroxyisobutyric acid with a sulphur trioxide body so as to convert it into the sulphuric ester of formula

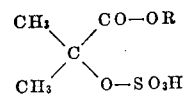

(where R stands for an alkyl group).

3. The step as claimed in claim 2 in which the sulphur trioxide body is fuming sulphuric acid.

4. The step as claimed in claim 2 in which the sulphur trioxide body is the addition product of sulphur trioxide and a tertiary base.

5. The step as claimed in claim 2 in which the sulphur trioxide body is the pyridine-sulphuric anhydride, C₅H₅N=SO₃.

6. Process for the manufacture of alkyl esters of methacrylic acid which comprises subjecting an ester of the formula

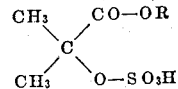

where R stands for an alkyl group) to a heat treatment.

7. Process for the manufacture of alkyl esters of methacrylic acid which comprises subjecting an ester of the formula

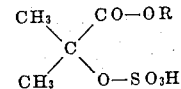

(where R stands for an alkyl group) to a heat treatment in the presence of a diluent.

8. Process as claimed in claim 7 in which the diluent is a substance adapted to combine with the sulphuric acid liberated during the heat treatment.

9. Process according to claim 7 in which the diluent is anhydrous sodium sulphate.

10. Process for the manufacture of alkyl esters of methacrylic acid which comprises treating an alkyl ester of α-hydroxyisobutyric acid with an agent adapted to convert it into the sulphuric ester of formula

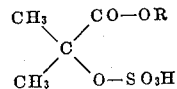

(where R stands for an alkyl group), and subjecting the resulting sulphuric ester to a heat treatment.

11. Process for the manufacture of methyl methacrylate which comprises treating methyl α-hydroxyisobutyrate with chlorosulphonic acid below 10° C., mixing the resulting sulphuric ester with anhydrous sodium sulphate, and distilling methyl methacrylate from the mixture by heating under reduced pressure.

12. As a chemical compound a sulphuric ester of formula

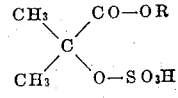

(where R stands for an alkyl group).

13. As a chemical compound a sulphuric ester of formula

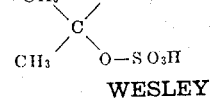

WESLEY COCKER.
JOHN S. H. DAVIES.
ROWLAND HILL.